PACKAGING OF A MAGNETIC HEAD ASSEMBLY

Filed April 2, 1958 2 Sheets-Sheet 1

July 24, 1962 YASUSHI HOSHINO 3,045,814

PACKAGING OF A MAGNETIC HEAD ASSEMBLY

Filed April 2, 1958 2 Sheets-Sheet 2

3,045,814

PACKAGING OF A MAGNETIC HEAD ASSEMBLY

Yasushi Hoshino, 462 1-chome, Tamagawa-Okusawacho, Setagaya-ku, Tokyo, Japan

Filed Apr. 2, 1958, Ser. No. 725,837
Claims priority, application Japan Apr. 6, 1957
1 Claim. (Cl. 206—46)

This invention relates to means for the attachment and replacement of magnetic sound recording and reproducing heads of a magnetic sound record reading apparatus.

In the magnetic sound recording and reproducing head for a conventional magnetic sound record tape, the head and the tape can be maintained in good contact condition even if there exists some deflection in the position of attachment of the head inasmuch as the tape is soft and elastic. On the other hand, in a magnetic sound record reading apparatus, it is necessary to maintain all the heads in correct position on the rotary body so that the gap portion of each head in scanning operation is kept in good contact with a magnetic sound record, because a magnetic sound record sheet is extended on a hard pressing plate and a plurality of heads arranged around the circumference of a rotary member at equal intervals are brought one by one in contact with the magnetic coating film of the sheet. Further in a magnetic sound recording and reproducing apparatus of this type, it is necessary to make each head movable in perpendicular direction in relation to the magnetic coating film of the sheet so that it can be brought in contact with the film and be removed from the film but not be movable in any other direction.

To mount the heads in the condition as described above on a rotary member of a magnetic sound recording and reading apparatus requires precise exact workmanship and careful adjustment and it is impossible for an ordinary person with little experience and no proper instruments to perform such a mounting and adjustment.

The object of this invention is to provide means by which the mounting and replacement of the heads can be carried out easily by those who have little experience and no special tools and instruments.

Another object of this invention is to provide means by which heads are made easily mountable and replaceable in their correct position by relatively inexperienced personnel without using any special instruments and tools.

Still another object of this invention is to provide a head comprising a case, a shoe part having iron pieces and an attachment which may be a cover of the case, and an electro-magnet having iron cores and coils, the iron pieces of the shoe part being adapted to be inserted between the iron cores of the electro-magnet and the case being adapted to be mounted in correct position around a rotary member of a magnetic sound record and reading apparatus.

Still another object of this invention is to provide an attachment member on the circumference of which a plurality of heads are attached in correct positions and which is adapted to be mounted on a rotary member of a magnetic sound recording and reading apparatus, whereby the replacement of worn heads with new heads can be easily effected by those having little experience and requiring no special instruments and tools.

Other objects and characteristics of this invention will become clearer as the descriptions with reference to the accompanying drawings proceed. In the drawings.

Figures 1, 2, 3, 4A, 4B, 4C, 5A, 5B, 5C, 6, 7, 8:
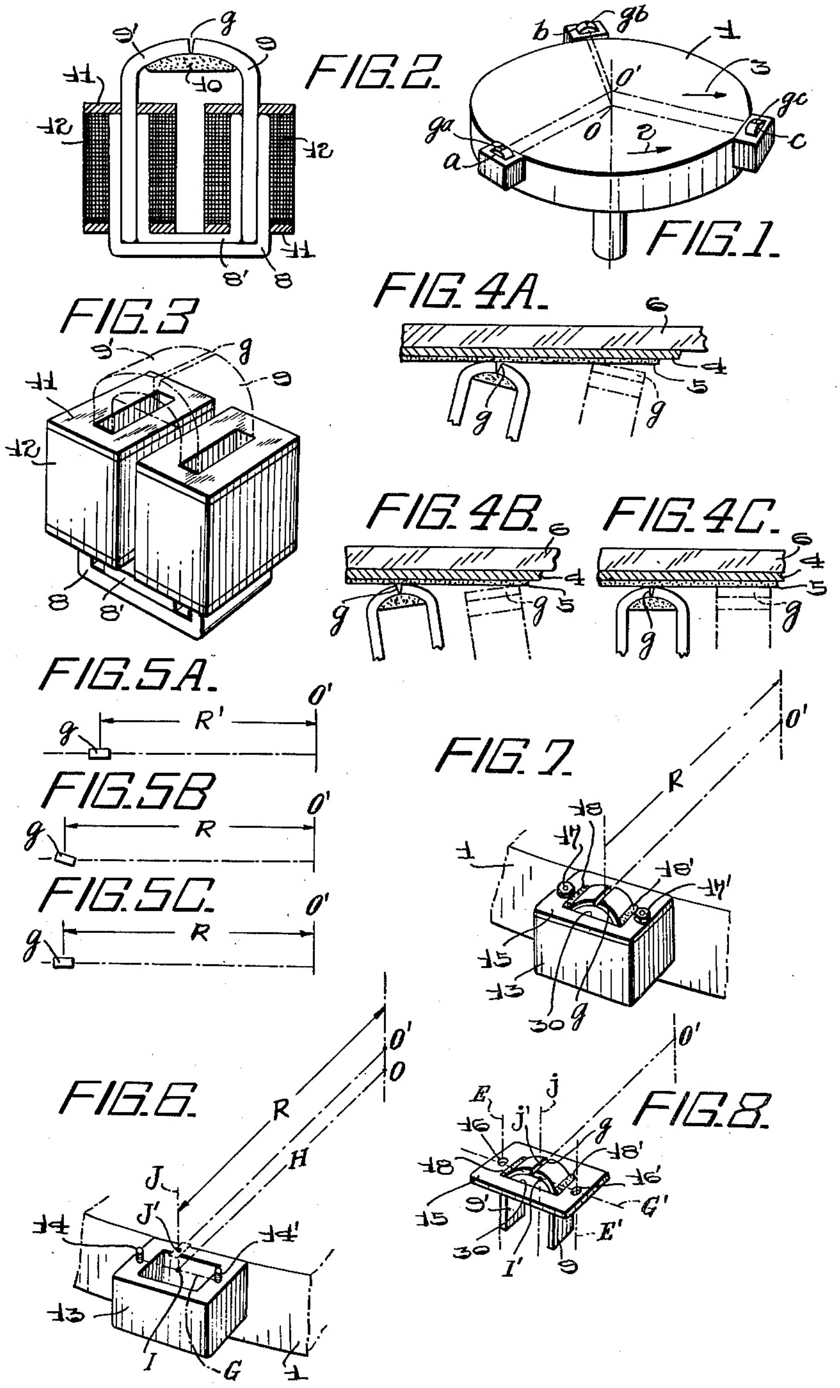
FIG. 1 is a perspective view of the rotary member of a magnetic sound recording and reading apparatus.
FIG. 2 is a front longitudinal sectional view of a head.
FIG. 3 is a perspective view of an assembly of the coil and the iron core of a head from which the shoe is removed.
FIGS. 4A, 4B and 4C are front partial longitudinal sectional views illustrating the relation between a sound record sheet and a head shoe in various conditions.
FIGS. 5A, 5B and 5C are diagrams showing the relation between the centre of rotation and a head in various conditions.
FIG. 6 is a perspective view illustrating a head case mounted on a rotary member.
FIG. 7 is a perspective view illustrating a head assembly attached.
FIG. 8 is a perspective of a head shoe assembled with a cover.

Referring to FIG. 1, a rotary member or a turn table 1 of a magnetic sound record reading machine is turned in the direction of arrow 2 at a constant speed and at the same time is shifted in the direction of 3 at a constant speed. A plurality of heads, for example, three heads *a*, *b* and *c*, are mounted on the turn table 1 in equal spaced relation, and the extensions of lines of the head gaps G*a*, G*b* and G*c* intersect with one another at a point O on the center line of the rotation of the turn table. A magnetic sound record sheet consisting of a paper layer 4 and a magnetic sound recording film 5 below a pressing plate 6 is arranged over the heads as shown in FIGS. 4A, 4B and 4C. The magnetic sound recording film 5 is demarcated by parallel straight lines and has a width equal to the linear distance between the heads, namely *a*—*b*, *b*—*c* and *c*—*a*.

The magnetic sound record sheet has a description of letters, figures, drawings, photographs or the like on the upper surface of the layer 4 which can be seen from above through a pressing plate 6 which is transparent.

When the turn table 1 is rotated and shifted as shown in FIG. 1 while the head energized for operation is maintained in contact with the magnetic sound record film 5 of the magnetic sound record sheet extended bearing against the pressing plate 6, magnetic sound tracks are formed on the magnetic sound record film 5.

When a sound reproducing head scans along the sound record tracks which have been formed as described above, the sound will be reproduced. While reproducing the sound, the operator can see and read through the transparent pressing plate 6 the description on the surface of the paper layer 4 which is related to the sound. This is the principle of a magnetic sound record reading apparatus, which has been described in U.S. patent application Ser. 635,335 filed January 22, 1957, now Patent No. 2,924,668.

One of the purposes of this invention is to provide a head which is suitable for the use in such a magnetic sound record reading apparatus. According to a preferred embodiment of this invention as shown in FIG. 2, the head has, in assembly, iron cores 8 and 8', coils 12, 12 around the iron cores, a frame 11 for the iron cores and coils, and a shoe formed by iron pieces welded together by solder 10, which shoe having a head gap *g* between the iron pieces which are adapted to be inserted between iron cores 8 and 8'.

The most important problem in a magnetic sound record reading apparatus is to have the head gap in close contact with the magnetic sound record film all the time in operation to give satisfactory scanning. It is necessary that all of the three heads satisfy this condition when they are in operation by turn.

The pressing plate 6 is a hard rigid material such as a glass plate or a thick plastic plate. Under such a condition, special contrivance must be provided for securing a good contact between the head and the magnetic sound record film. In an ordinary tape recorder, it is easy to obtain a good contact since the tape used is soft and elastic and it does not need any special consideration. On the contrary, the condition is entirely different in the magnetic sound record reading machine.

If the contact between the gap of the head and the magnetic coating film is not perfect, it is evident there arise various difficulties. For instance, if the three heads are not attached correctly on the turn table, the reproduction of sound may become imperfect, the high frequency part of sound electric current may be missed, and the sound may become irregular. As an example, imperfect contact between the head gap $g$ and the magnetic sound coating film 5 which may arise in practical operation will be explained in the following.

In FIGS. 4A, B and C, a shoe head is drawn in full line when seen from the front and in chain line when seen from the side. FIGS. 4A and B illustrate the cases where a shoe head is inclined in relation to the surface of the magnetic coating film. It is noted that the gap $g$ of the shoe head is not in good contact relation with the magnetic sound record film. If the gap occupies such a position, the contact is made only in a part thereby bringing about decrease of sound output, and particularly the high frequency part of the sound record will be seriously affected. In order to avoid such defect, it is necessary to keep the head in right position as illustrated in FIG. 4C.

FIGS. 5A, B and C illustrate the distances between the center of a gap $g$ in different positions and the center O′ of the turn table. If the gap is in correct position as shown in FIG. 4C, the distance between the center of gap $g$ and the central line of the turn table shall be R but when the gap is attached in a wrong place as shown in FIG. 5A, the distance R′ will be different from R, even if the head is maintained in perpendicular to the surface of the magnetic coating film.

If the gap $g$ is in correct position and the width of the magnetic coating film is L, the following relation is maintained in case of three heads:

$$R=\frac{L}{2\sin 60^\circ}$$

If the gap is inclined as shown in FIG. 5B, it is apparent that, even if the distance from the center of the gap $g$ to the center line O′—O′ of rotation of the turn table 1 is equal to R, the direction of the gap does not pass the center line O′—O′ of the rotation. With a gap as shown in FIG. 5A or FIG. 5B, it is impossible to obtain a good reproduction of sound since the head cannot scan the sound track correctly when it is rotated around the axis O′—O′.

In the use of a magnetic sound record sheet on a magnetic sound record reading machine, it is often the case that a magnetic sound record sheet is recorded with a certain magnetic sound record reading machine and is reproduced with another magnetic sound record reading machine. Even if recording and reproducing is effected by a same apparatus, the head of recording is not necessarily same as the head of reproducing. Accordingly it is important that all the heads are always maintained in correct position.

In practical manufacture of magnetic sound record reading machines, to satisfy the condition as described above is not easy since it requires high degree of exactness in the attachment of a plurality of heads and requires various machineries and meters of high precision as well as experienced workmanship and long time. Much more difficult it will be when it becomes necessary to change the heads due to wear and tear of the old heads and it is attempted to replace with new ones in the place where there are no instruments and skilled workers for such a work. This invention eliminates such difficulties.

A further aspect of a preferred embodiment of this invention will be explained in detail with reference to FIGS. 6, 7 and 8. In FIG. 6, the turn table 1 is provided with a head case 13 which is fixed by two screws 14 and 14′. The line G is a line connecting the centers of said screws 14 and 14′ on the surface of the case 13. The case 13 is fixed in such a way as the straight line H connecting the center I of the line G with the center of rotation O is equal to the radius of scanning of a head accommodated in the case 13.

To fix the head case 13 on a turn table as described above is easy for a factory where jigs and instruments for the purpose are provided. At points I and O, vertical lines J and O—O′ are erected as shown in FIG. 6. On the line, a point O′ is selected at a determined distance and a line O′—J′ is drawn in parallel to line I—O to decide point J′ by the intersection of lines O′—J′ and J. It will be noted that O—O′ is equal to I—J′. If the gap is arranged to have its center at point J′ and its direction is in the line of J′—O′, the condition for the position illustrated in FIG. 4C and FIG. 5C will be satisfied and the head will be able to scan sound tracks correctly.

In FIGS. 7 and 8, 15 is a cover of the case 13 and has holes 16 and 16′ in alignment with the screws 14 and 14′ of FIG. 6. After placing the cover 15 on the case 13 by engaging holes 16 and 16′ on the screws 14 and 14′, the cover is tightly fixed by nuts 17 and 17′.

In FIG. 8, if it is assumed that G′ is the line connecting vertical lines passing through the center of holes 16 and 16′ and is in contact with the lower surface of the cover 15, and $j$ is a vertical line erected at the center of the line G′, and $j'$ is a point having a distance I—J′ of FIG. 6, a head gap $g$ which has its upper surface at the point J′ and its direction in the line J′—O will be in correct position. According to the present invention the iron pieces 9 and 9′ of the head shoe are fixed through the windows 30 of the cover 15.

In FIG. 8, 18 and 18′ represent solder fixing iron pieces 9 and 9′ and the cover 15 after positioning the iron pieces 9 and 9′ in correct position as described above.

In a factory having proper instruments and tools, to fix the head gap $g$ and the cover in the condition satisfying the requirements as described above by soldering is easy and can be carried out very exactly at high speed. It is also easy to manufacture the head shoe having the attachment member as shown in FIG. 8 in mass production scale.

Once such a head shoe is manufactured, it is easy to insert the iron pieces 9 and 9′ of said head shoe between iron cores 8 and 8′ having coils therearound as shown in FIG. 3 and to fix the assembly of the head shoe, iron cores and coils in the case 13 by fixing the attachment member or cover 15 by means of the screws 14 and 14′ passing through the holes 16 and 16′ of the cover 15 and nuts 17 and 17′. Thus the gap $g$ can be mounted very easily in correct position on a magnetic sound record reading apparatus.

Figure 9:
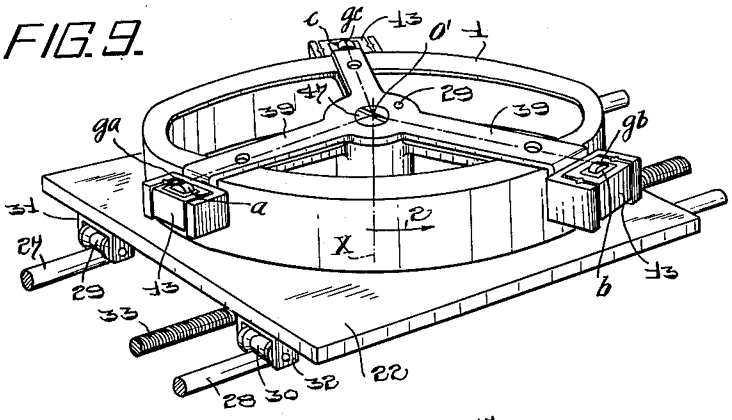
FIG. 9 is a partial perspective view of a magnetic sound recording and reading apparatus illustrating the group of heads mounted on the apparatus.
Figures 10, 11, 12:
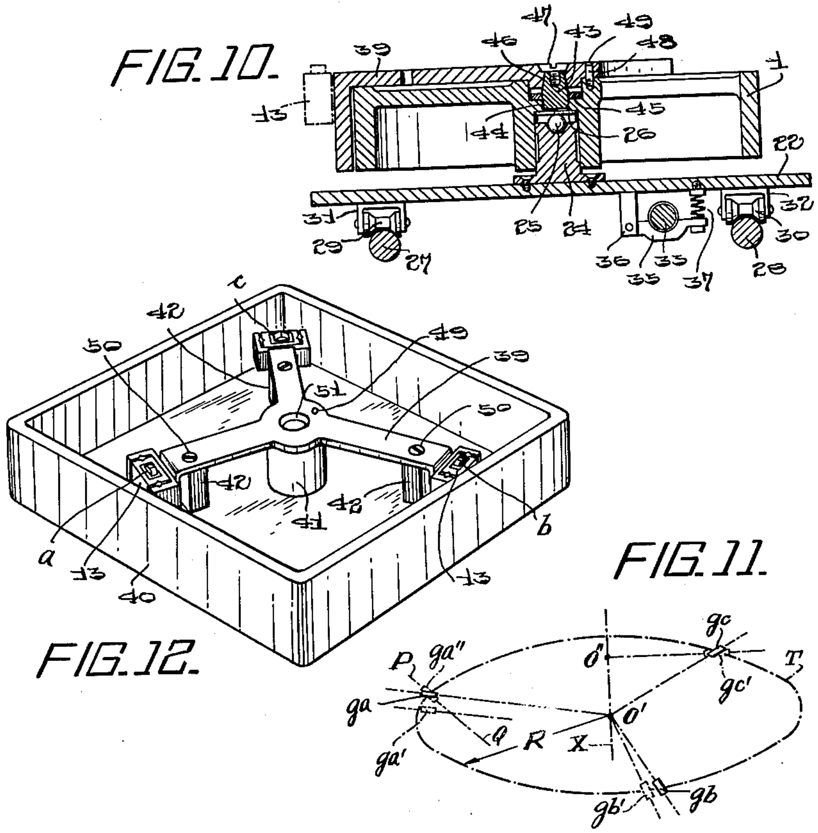
FIG. 10 is a front longitudinal sectional view of the apparatus of FIG. 9.
FIG. 11 is a diagram illustrating the positions of heads attached on a turn table.
FIG. 12 is the group of heads for exchange in storage.

In FIGS. 9, 10 and 11, a rotary member or a turn table 1 has three heads $a$, $b$ and $c$ on its circumference at equal intervals. The turn table is fixed on a shifting plate 22 and rotates around its central axis X in the direction of arrow 2. In FIG. 10, 24, 25 and 26 represent respectively a bearing, a steel ball and a steel plate. The shifting table 22 is slidable on guide rails 27 and 28 by means of rollers 29 and 30 rotatably journalled in members 31 and 32 fixed on the shifting plate 22. A screw 33 is rotated at a determined speed by a motor (not shown) to move the shifting plate 22 in one direction through a half nut 35 in engagement with the screw 33 and a support 36 fixed on the plate 22. The meshing between the screw 33 and the half nut 35 is secured by a spring 37.

The extensions of lines of gaps G$a$, G$b$ and G$c$ of heads $a$, $b$ and $c$ meet at a point O′ on the central line or axis X and the distances between G$a$ and O′, G$b$ and O′, and $Gc$ and O′ are all equal, these lines connecting gaps and the center point O′ being all in a plane parallel to the plane of the shifting plate 22. These are necessary conditions and otherwise correct recording and reproducing of a magnetic sound record sheet cannot be effected by a magnetic sound record reading machine as described above.

The head cases 13 of heads *a*, *b* and *c* may be mounted on the turn table 1 by any convenient device so that the cases are allowed to move vertically but not in any other direction. Such a device can be contemplated easily by those skilled in the art, and it will be needless to dwell upon such a device.

During a long use of a group of heads, they will be worn through the friction between the surface of heads and the magnetic sound record sheet and consequently they must be replaced with new ones. However, the positions of all the heads must satisfy rigorous conditions as described above. FIG. 11 is a diagram for explaining the conditions. Assume that the head gap shall rotate around the axis X with a radius R of a determined length, and describes a locus T. The plane of the locus T and the axis X intersect at right angle and the center O′ of the circular locus T is on the line of the axis X. In FIG. 11, the head gaps $Ga$, $Gb$ and $Gc$ shown in full lines are those in correct positions. In these positions, $Ga$, $Gb$ and $Gc$ are separated by an angular space of 120° and their central lines meet at a point O′ on the line of the axis X, and the central point of each gap describes the locus T.

However, errors in attachment of heads on the turn table are apt to occur. For instance, a head $Ga$ may be mounted too low in the position of $Ga'$ thereby bringing the center of the head gap below the circumference of T. Again it is possible that the line of the gap takes the direction of P—Q although the center of the gap is on the locus T and the line is not orientated to O′, as shown by $Ga''$ in FIG. 11. Further, the head may be placed in a wrongly spaced relation not having an angular space of 120° as shown by $Gb'$, or in a wrong direction as shown by $Gc'$ the line of which gap intersects with the axis not at the point O′ but at a deflected point O″.

All these erroneous attachments must be avoided in order to secure correct recording and reproducing and all the heads must occupy positions as shown by full lines. The attachment of the head in correct position, however, is a difficult task when there are no proper jigs and instruments for the purpose. If there is some error with only one of the heads, the use of the apparatus will be greatly hindered or prevented entirely.

In FIGS. 9, 10 and 12, an attachment member 39 is provided to solve the difficulty as described above. In this embodiment, heads *a*, *b* and *c* are not mounted directly on the turn table 1 but on the attachment member 39. The attachment of heads in correct positions on the member 39 is effected by means of proper jigs and instruments and the member 39 with the heads $Ga$, $Gb$ and $Gc$ is placed on the turn table 1 as shown in FIGS. 9 and 10. Then head gaps will be automatically positioned in right places as shown in FIG. 11. The attachment member 39 affixed with a group of heads may be prepared in a factory where instruments and labours for exercise of workmanship of high degree are available and said attachment may be kept in reserve in a storing box 40 as shown in FIG. 12 by the user of a magnetic sound record reading machine. When any trouble occurs with a head or heads in use, the user can remove the attachment member 39 with a troubled head and replace it with a new attachment member 39 in store and thus the difficulty can be overcome very easily. The attachment with the troubled head may be sent back to a factory having proper instruments and labour for repair and be used again.

The store box 40 of FIG. 12 has supporting posts 41 and 42 and the member 39 is fixed thereon by screws 50.

The construction of an embodiment of the invention having the attachment member 39 will be explained in more detail with reference to FIG. 10.

On the turn table 1, a metallic member 43 is screwed and the position of the member 43 is adjustable in up and down direction to some extent. When the position of the member 43 is adjusted it can be fixed by a lock nut 45. The top of the member 43 has a conical shape part 46 and the attachment member 39 having a central hole 51 with side wall in a slope adapted to come in registration with said conical part is set on the top conical part 46 of the member 43 to place the center of the circular locus of all heads on the axis of X. 47 is a screw for pressing the attachment member 39 against the metallic member 43 and the turn table 1 and to fix the member 39, while 48 is a guide pin fixed on the turn table 1 to engage with a hole provided in the member 39 for securing correct setting and preventing slip of the member 39 in relation to the turn table 1.

It will be understood that a plurality of magnetic record erasing heads may be fixed on the attachment member 39 together with recording or reproducing heads.

In the above, an example of presetting a head shoe consisting of iron pieces 9 and 9′ provided with a gap by welding with metallic solder 10 on a cover 15 is described, but it is a matter of course that this invention is also applicable to an embodiment in which not only the head shoe but the whole of the head is previously set on the cover 15 or the attachment element.

A preferred embodiment of this invention is described above but the principle of using heads previously set in a magnetic sound record reading apparatus as described above with a view of facilitating the setting of heads in correct positions will be attained by changing arrangements in various ways without departing from the scope and spirit of claim of this invention.

What I claim is:

For a magnetic sound recording and reproducing apparatus comprising a turntable provided with a plurality of sound recording and reproducing heads arranged for the rotation and longitudinal movement below a magnetic sound sheet so that the magnetic sound record sheet can be scanned by the heads on the turntable: apparatus comprising an attachment member having the same diameter as that of the turntable and including a central boss and a plurality of arms extending radially from said central boss and arranged in equally spaced relation, each arm including a downwardly extending end part, a head case secured to the end part of each arm, head units contained and fixed tightly in the head cases, each head unit including a coil, core and heads, and further including a cover, and a storage box including a central post and a plurality of further posts positioned around the central post, said posts being located at positions corresponding to those of said central boss and the arms of said attachment member, said attachment member being accommodated in the storage box.

References Cited in the file of this patent

UNITED STATES PATENTS

| | | |
|---|---|---|
| 1,665,784 | Hornauer | Apr. 10, 1928 |
| 2,706,752 | Dupy | Apr. 19, 1955 |
| 2,750,449 | Thompson et al. | June 12, 1956 |
| 2,860,191 | Runge et al. | Nov. 11, 1958 |
| 2,908,770 | Warren | Oct. 13, 1959 |
| 2,962,558 | Hoshino | Nov. 29, 1960 |

FOREIGN PATENTS

| | | |
|---|---|---|
| 181,974 | Austria | May 10, 1955 |
| 544,162 | Belgium | Jan. 31, 1956 |